United States Patent
Nagae et al.

(10) Patent No.: US 6,317,841 B1
(45) Date of Patent: *Nov. 13, 2001

(54) COMPUTER SYSTEM USING STOP CLOCK FUNCTION OF CPU TO ENTER LOW POWER STATE

(75) Inventors: Akihito Nagae; Koichi Senuma; Takeyuki Iguchi, all of Tokyo (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/074,514

(22) Filed: May 8, 1998

Related U.S. Application Data

(63) Continuation of application No. 08/654,875, filed on May 29, 1996, now abandoned.

(30) Foreign Application Priority Data

May 30, 1995 (JP) .................................................. 7-132196

(51) Int. Cl.[7] .............................. G06F 1/26; G06F 1/28; G06F 1/30
(52) U.S. Cl. .......................... 713/322; 713/320; 713/324; 713/300; 713/501; 713/502; 713/600
(58) Field of Search ..................................... 713/322, 320, 713/324, 501, 502, 600, 300

(56) References Cited

U.S. PATENT DOCUMENTS

| | | |
|---|---|---|
| 4,787,032 | 11/1988 | Culley . |
| 4,851,987 | 7/1989 | Day . |
| 4,980,836 | 12/1990 | Carter et al. . |
| 5,025,387 | 6/1991 | Frane . |
| 5,125,088 * | 6/1992 | Culley .................................. 395/500 |
| 5,369,771 * | 11/1994 | Gettel .................................. 395/750 |
| 5,392,437 | 2/1995 | Matter et al. . |
| 5,451,892 | 9/1995 | Bailey . |
| 5,473,767 * | 12/1995 | Kardach et al. ..................... 395/550 |

(List continued on next page.)

FOREIGN PATENT DOCUMENTS

| | | |
|---|---|---|
| 63-100522 | 5/1988 | (JP) . |
| 3-116210 | 5/1991 | (JP) . |
| 5-11897 | 1/1993 | (JP) . |

OTHER PUBLICATIONS

Nakamura, Nobutaka et al., "Computer System Capable of Controlling Operation Speed of CPU", U.S. Ser. No. 08/364,720, filed Dec. 27, 1994.

"Intel 486 Microprocessor Family Data Book Addendum: SL Enhanced Intel 486 Microprocessor Family", Intel, Jun. 1983.

"Pentium Processor Family User's Manual", Intel, 1994.

"Peripheral Components: Chip Sets, PC I/O Peripherals, Memory Controllers, Keyboard Controllers, Support Peripherals", Intel, 1995.

Primary Examiner—Ayaz Sheikh
Assistant Examiner—Frantz B. Jean
(74) Attorney, Agent, or Firm—Finnegan, Henderson, Farabow, Garrett & Dunner, L.L.P.

(57) ABSTRACT

The CPU speed is apparently decreased, and current consumption is reduced by asserting a stop clock (STPCLK#) signal at a predetermined interval. When a system event (INTR, NMI, SMI, SRESET, and INIT) occurs, assertion of the STPCLK# signal is inhibited for a predetermined time to allow a high-speed operation. In an ISA refresh cycle, by asserting the STPCLK# signal instead of a conventional HOLD/HLDA cycle, the refresh cycle is executed in a stop grant state.

10 Claims, 12 Drawing Sheets

U.S. PATENT DOCUMENTS

| | | |
|---|---|---|
| 5,513,361 | 4/1996 | Young . |
| 5,546,568 * | 8/1996 | Bland et al. ........................ 713/501 |
| 5,553,236 * | 9/1996 | Revilla et al. ................. 395/183.01 |
| 5,560,001 | 9/1996 | Kardach et al. . |
| 5,560,002 | 9/1996 | Kardach et al. . |
| 5,590,342 | 12/1996 | Marisetty . |
| 5,655,127 * | 8/1997 | Rabe et al. .......................... 713/322 |
| 5,715,467 * | 2/1998 | Jirgal ................................... 713/300 |
| 5,931,951 * | 8/1999 | Ando ................................... 713/324 |

* cited by examiner

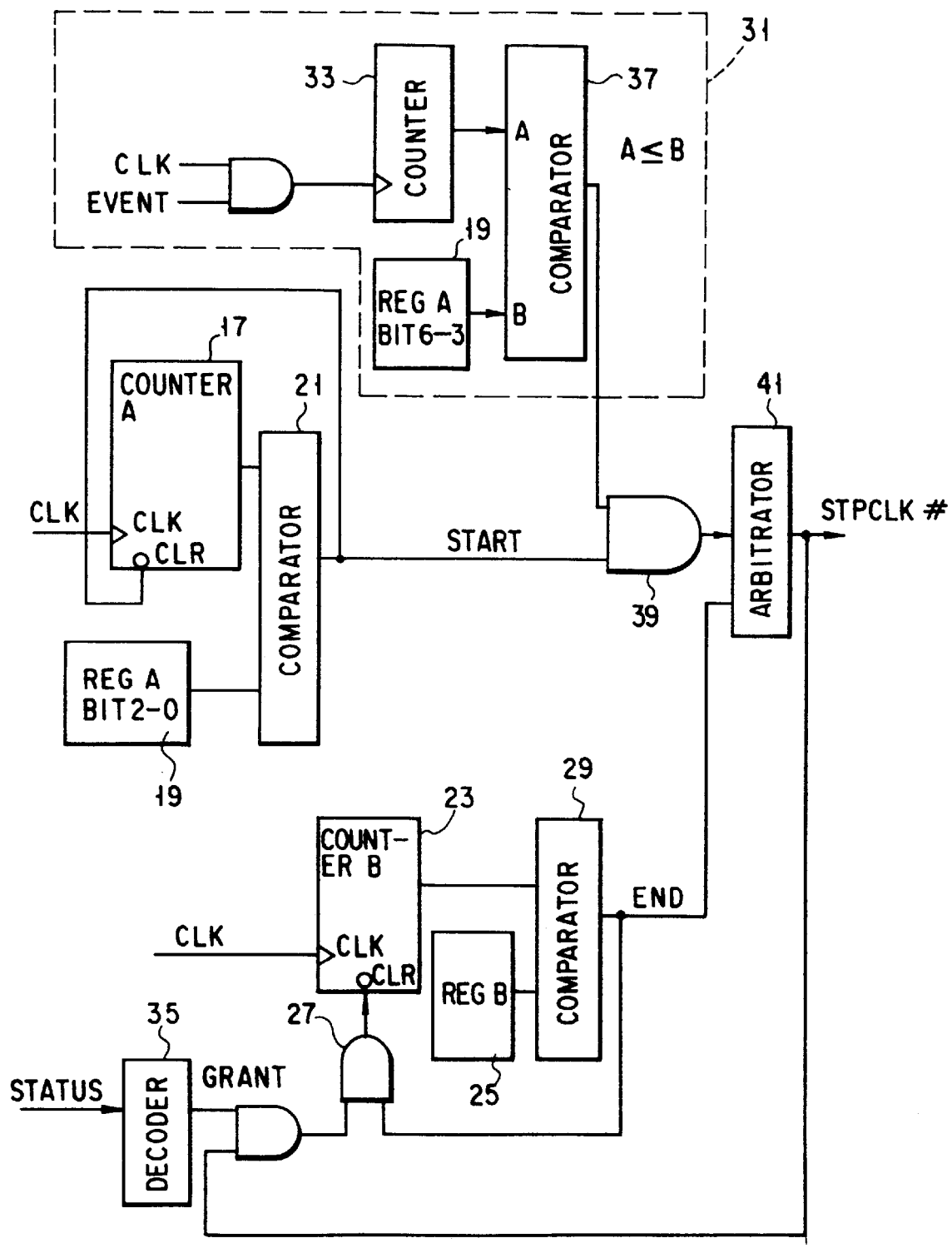
F I G. 4

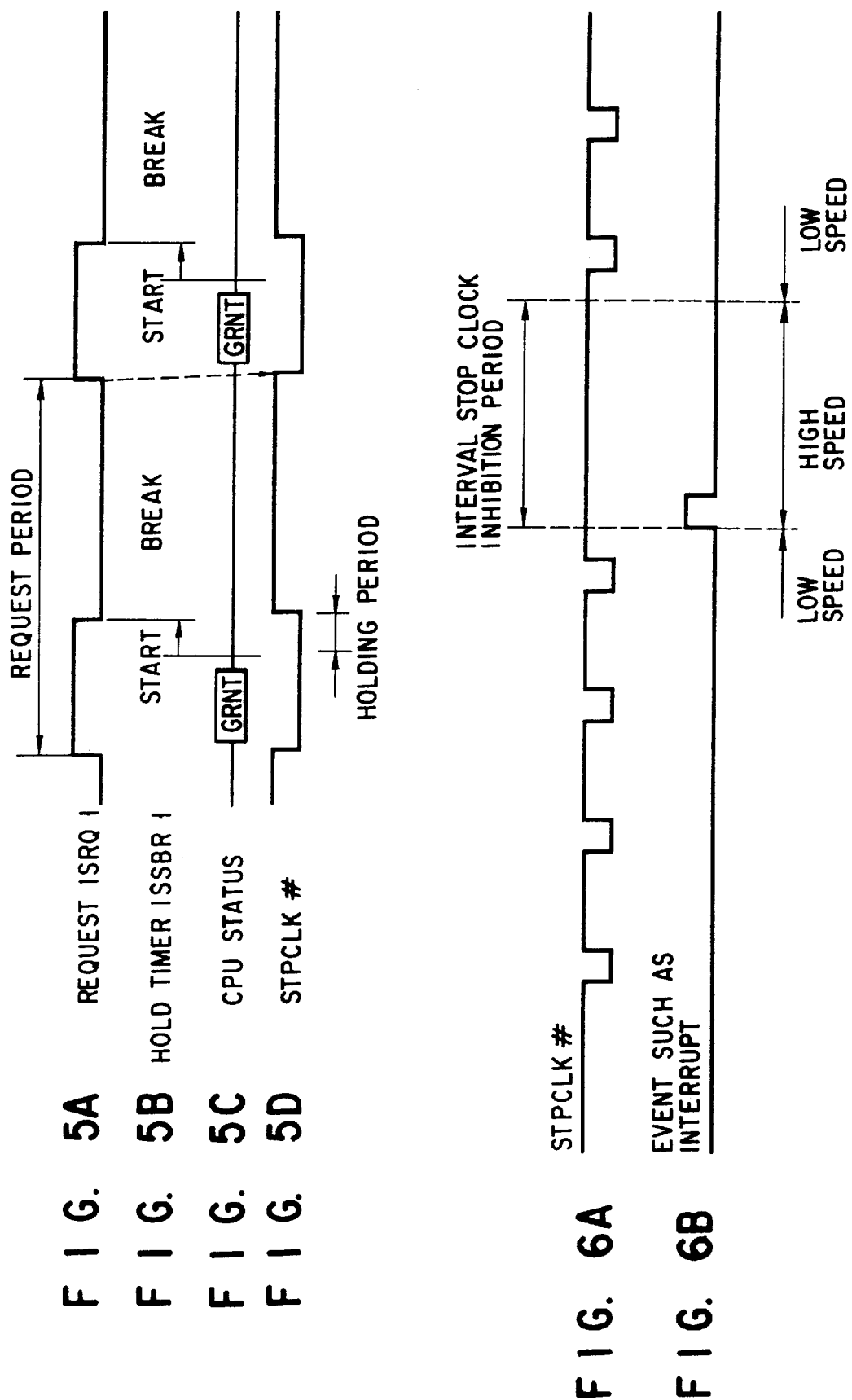

| | INTERVAL STOP CPU IN OPERATION | INTERVAL STOP STPCLK # = 0 | INTERVAL STOP DURING GRANT STATE |
|---|---|---|---|
| INTR (IRQ 0 DUE TO TIMER) | PRESENCE/ ABSENCE | PRESENCE/ ABSENCE | PRESENCE/ ABSENCE |
| INTR (IRQ 0~IRQ15) SMI NMI SRESET (INIT) | START INHIBIT TIMER | START INHIBIT TIMER AND WAIT STOP GRANT CYCLE | STOP BREAK AND START INHIBIT TIMER |
| VGA ACCESS | | | VGA ACCESS IS NOT CAUSED |

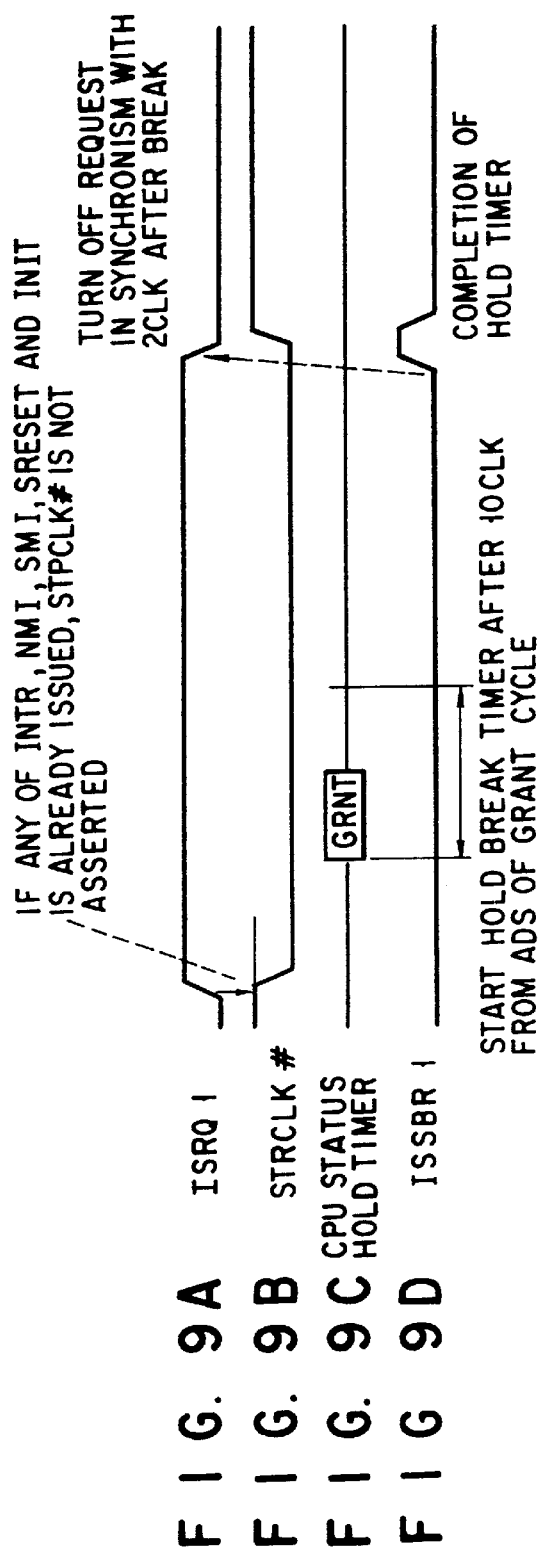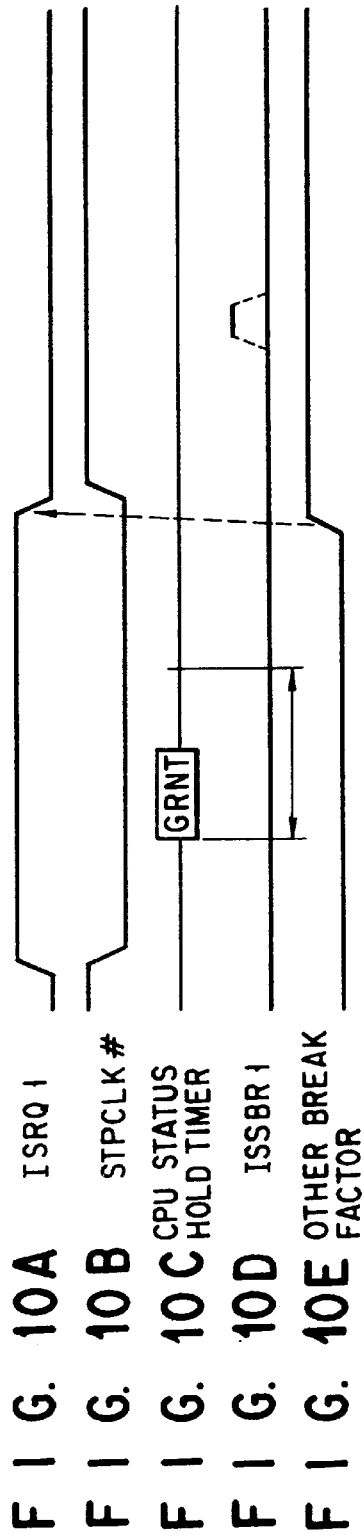

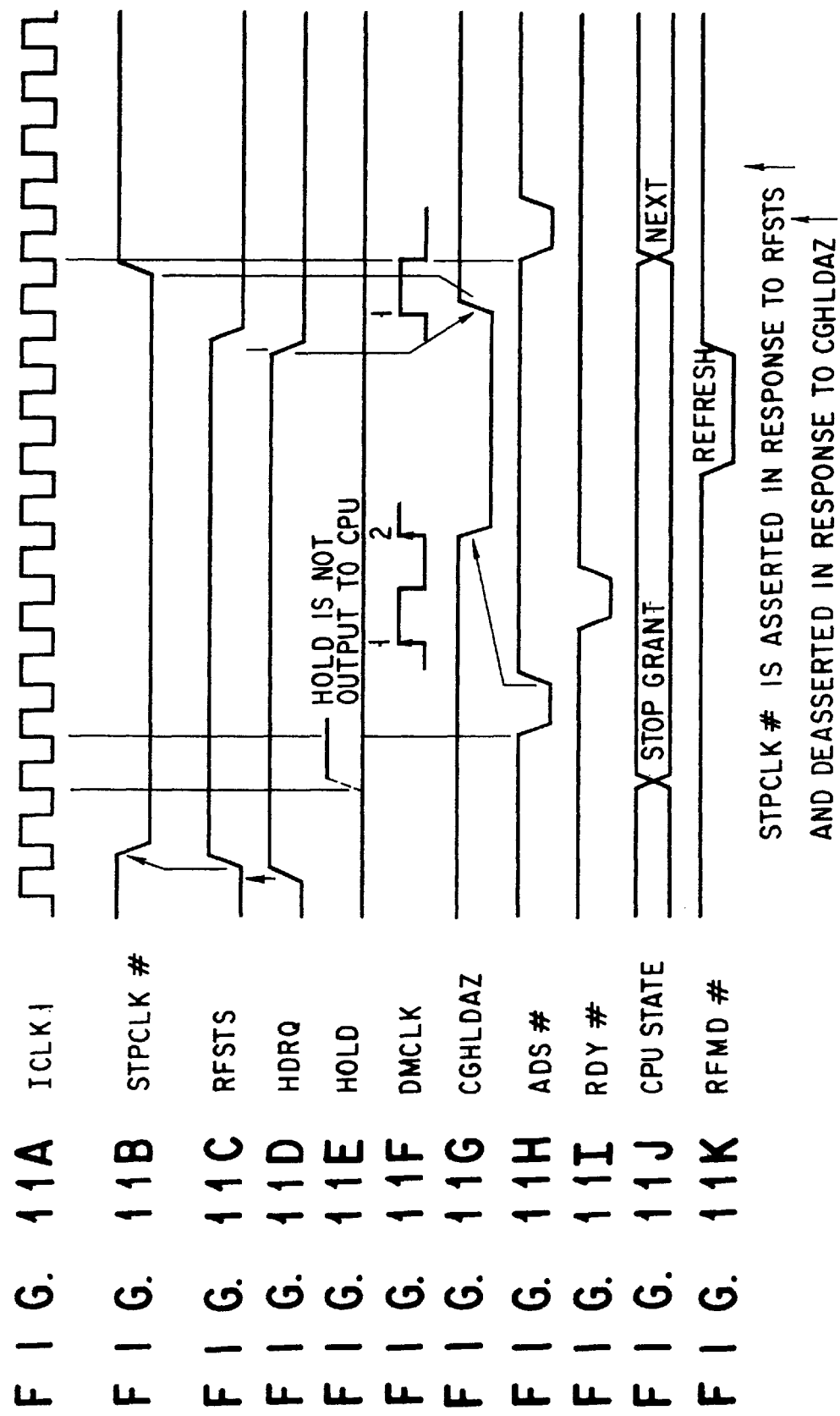

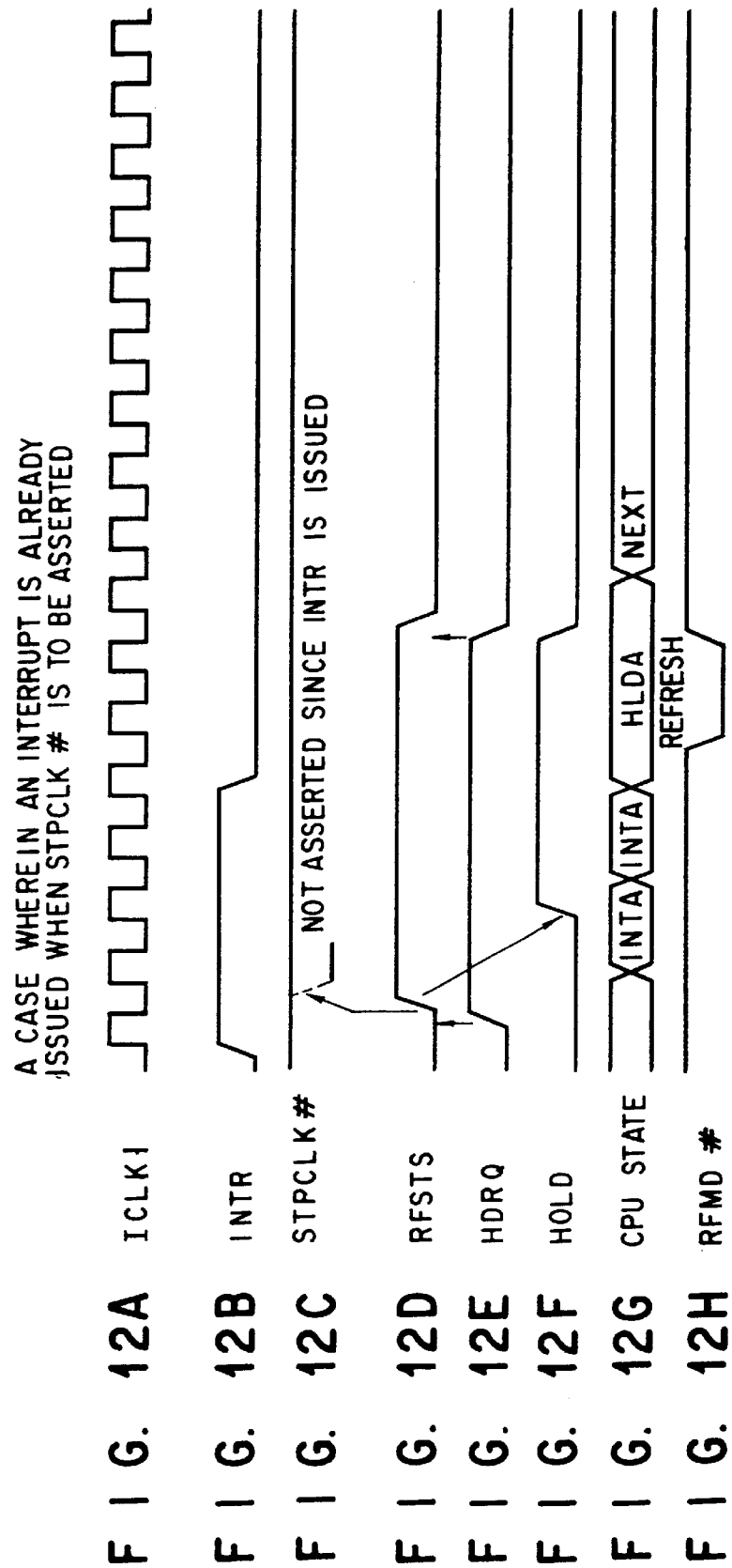

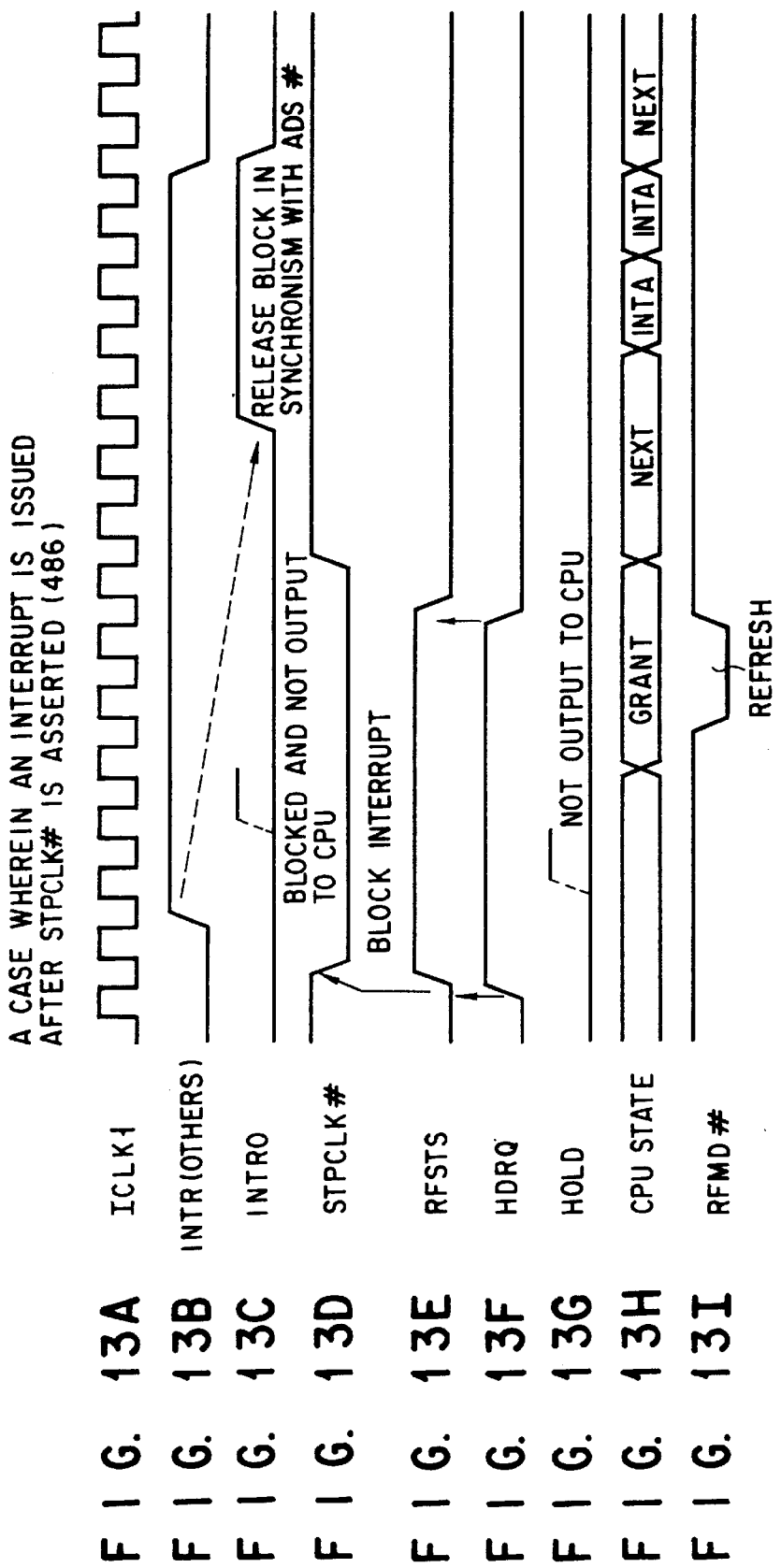

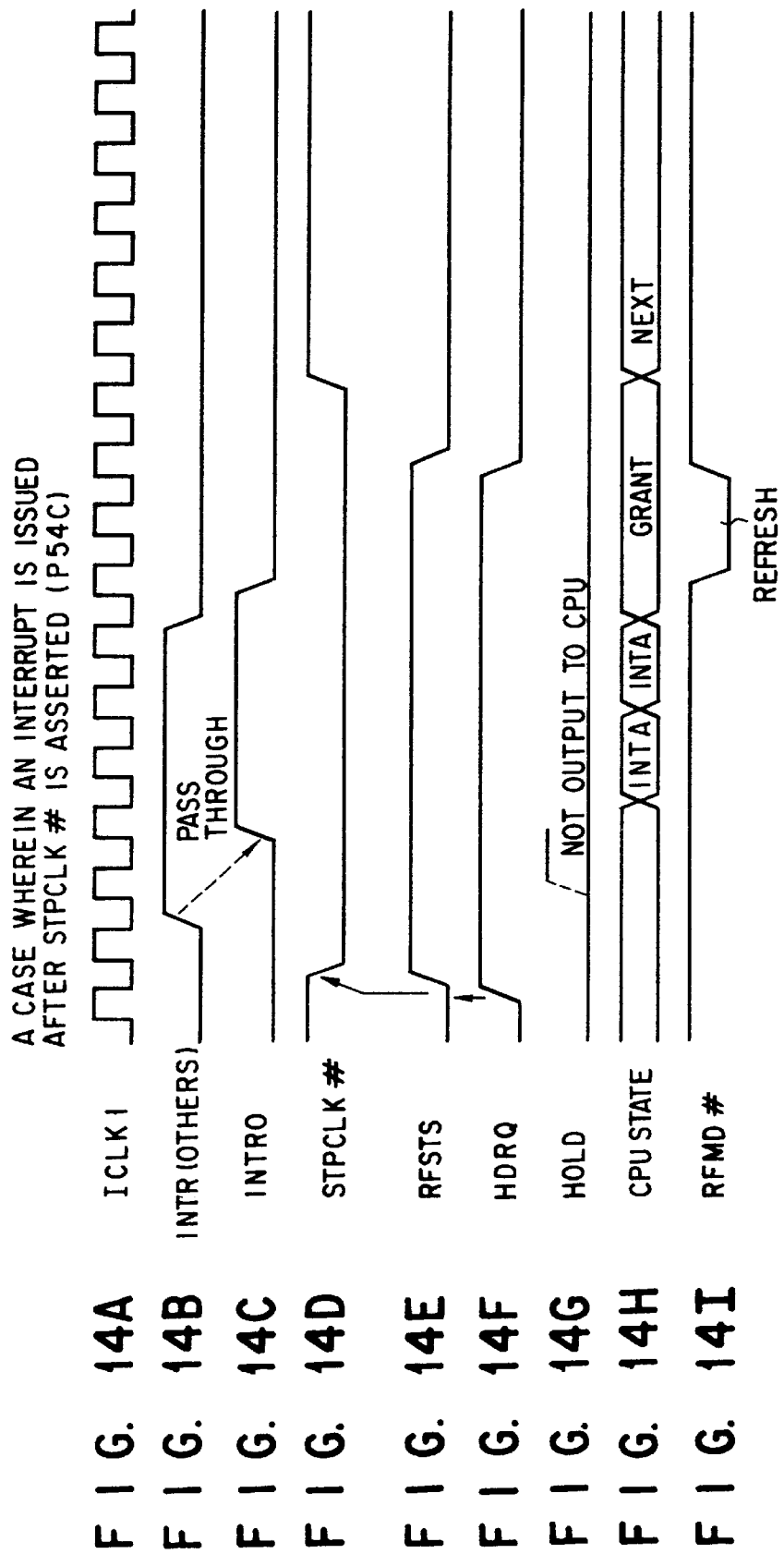

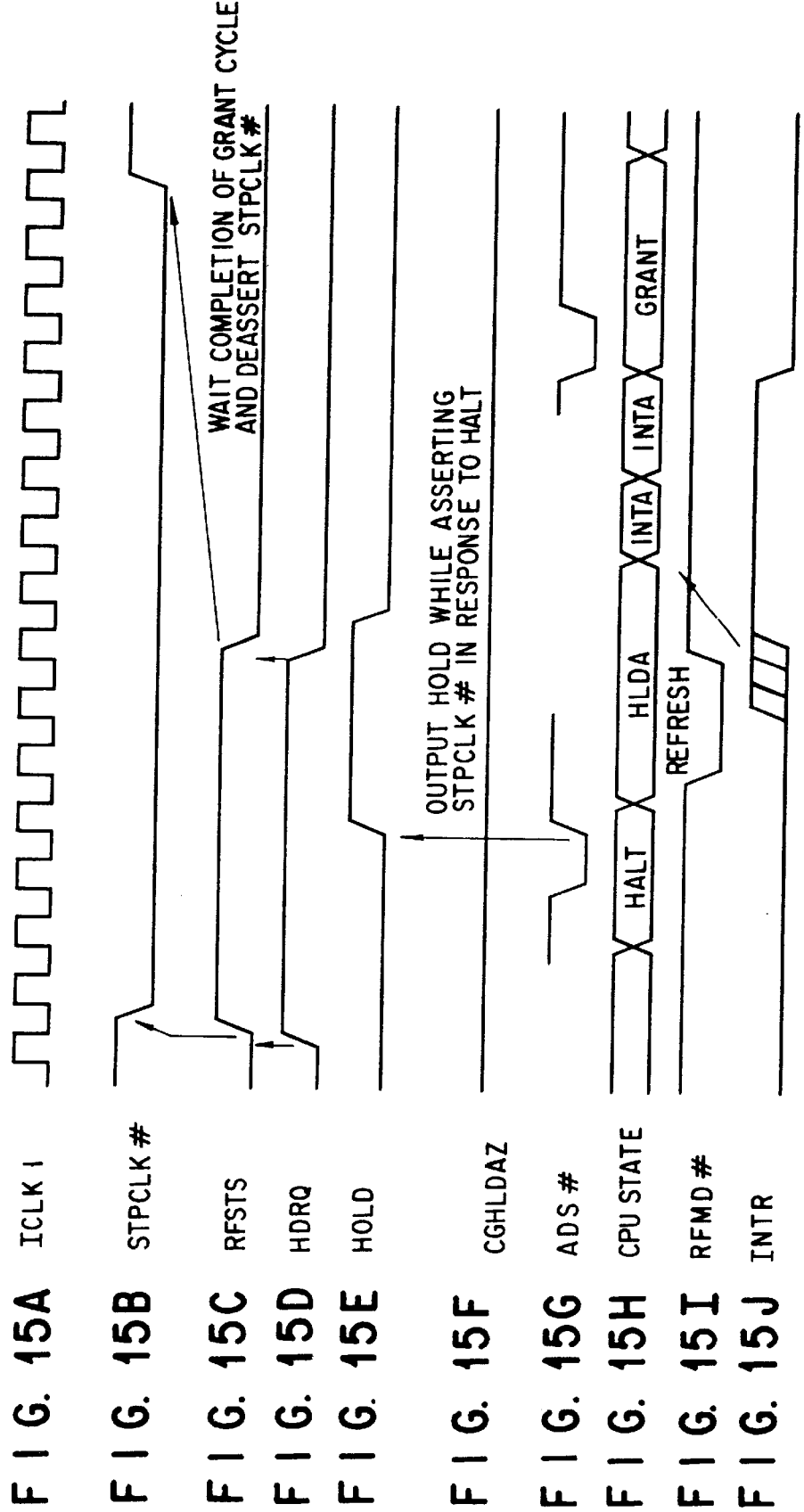

COMPUTER SYSTEM USING STOP CLOCK FUNCTION OF CPU TO ENTER LOW POWER STATE

This is a continuation of application Ser. No. 08/654,875, filed May 29, 1996 now abandoned which is incorporated herein by reference.

BACKGROUND OF THE INVENTION

1. Field of the Invention

The present invention relates to a computer system such as a personal computer and, more particularly, to a computer system using a stop clock function in the system to realize a power saving mode.

2. Description of the Related Art

In recent years, various notebook or laptop type portable personal computers which allow easy transport and an operation with batteries have been developed. In a computer of this type, various power saving means have been examined to make the battery drive time as long as possible.

For example, to decrease the power consumption of a CPU, the CPU operation speed is decreased to minimize the current consumption of the CPU.

A technology for controlling the CPU operation speed is disclosed in U.S. Pat. No. 5,125,088, for example. The speed control of the microprocessor will now be described with reference to FIGS. 1 and 2.

The speed control of the microprocessor can be initiated by either the floppy drive motor spin-up or enable 2 or the speed control software 4. The computer operator interacts with the computer through a utility program to set the speed of the microprocessor. This action by an operator is represented in FIG. 1 by block 4.

As illustrated in FIG. 1, the floppy drive enable 2 is logically ORed with the software controlled speed control 4 and logically ANDed with the speed control bypass switch 2. In the event the bypass switch 2 is closed, the speed control mechanism is inoperative. The speed control command is then logically ANDed with the speed control timer 8, therefore, the CPU HOLD output to the CPU remains active for as long as the timer remains active.

The speed control command is logically ORed with the arbitrated output of the arbitration logic of the DMA request 10 and the REFRESH request 12.

The DMA request/REFRESH request is arbitrated by arbitrator logic 14 to prevent both a DMA and REFRESH request from occurring simultaneously.

The HOLD request 16 to the CPU can be generated by either the REFRESH request, DMA request or the speed control logic. As will be described infra these holds cannot occur simultaneously because of the logic which controls each function.

The speed control is initiated by the following four CPU instructions:

1) MOV AL, 92H
2) OUT 4BH, AL
3) MOV AL, XX
4) OUT 4AH, AL

The one-shot time delay set in the speed control timer is set by instruction 3. Address 4BH in instruction 2 is the control word register.

The speed adjustment software controls the setting of the one-shot timer. The operator of the machine selects a time delay setting by selecting one of the arbitrary designations set forth below:

COMMON
FAST
HIGH or by selecting a speed setting from 1 to 50 where the setting "1" corresponds to the slowest machine speed which can be simulated by this microprocessor and "50" corresponds to the highest speed which can be simulated by this microprocessor.

It should be noted that the designation "COMMON" will simulate a microprocessor speed equivalent to an 80286 microprocessor operating at a 6 MHz clock rate; the designation "FAST" will simulate a microprocessor speed equivalent to an 80286 microprocessor operating at an 8 MHz clock rate; the designation "HIGH" will simulate the microprocessor speed of an 80386 microprocessor operating at the 16 MHz clock rate; full speed of an 80386 microprocessor.

The arbitrary speed designation of "3" on a scale of 1 to 50 corresponds to the simulated speed of an 8088 microprocessor and the arbitrary speed designation of "50" on a scale of 1 to 50 corresponds to the designation "HIGH" described above.

The one-shot timer is set by setting register AL to the required hexadecimal value which corresponds to an operator's selection of either a value of "COMMON", "FAST" or "HIGH" or by an operator's selection of a decimal number in the range of 1–50.

The one-shot timer is set by setting register AL to a hexadecimal value corresponding to the "FAST" mode whenever the floppy drive motor is enabled. Enabling the floppy drive motor reduces the apparent microprocessor speed since most floppy drive operations indicate either a transfer of data from a copy-protected diskette or other diskette operation which cannot be performed at the full 80386 processor speed.

In FIG. 2, a 4 MHz clock range is illustrated as "DCLK". Each square wave represents 250 microseconds.

3-1: The REFRESH request occurs once every 15 microseconds. This request is arbitrated with the Direct Memory Access (DMA) request to prevent simultaneous requests. The REFRESH request is then logically ORed with the other request sources to generate the CPU "HOLD" request.

3-2: Sometime after the HOLD request is generated and after the current CPU by cycles have been completed, the CPU will stop executing the program and grant the HOLD acknowledge (ACK).

3-3: The HOLD ACK is logically gated with the arbitrated REFRESH request to form the REFRESH acknowledge (ACK) signal to the REFRESH controller.

3-4: The REFRESH ACK signal triggers the digital one-shot which in turn sets the STOP request signal active. Since the REFRESH request is still present (high), there is no change in the CPU state.

3-5: The REFRESH controller executes the rEFRESH cycle on the system bus and then releases the REFRESH request.

3-6: Release of the REFRESH request also releases the REFRESH ACK signal and ends the REFRESH portion of the cycle. (If the STOP request is not present, then the HOLD request is released and the CPU begins executing again).

3-7: During the duration of the one-shot timeout, the STOP request remains active and the CPU cannot run bus cycle (i.e., execute code). This timeout value is variable from 0 duration (e.g., CPU begins executing immediately after REFRESH equivalent to full speed microprocessor cycle) through 15 microseconds where the CPU never gets a change to execute another REFRESH and STOP cycle will begin as soon as the last cycle is completed (e.g., the microprocessor fully stopped). Choosing values between 0 and 15 microseconds the STOP request will be dropped when the one-shot times out.

3-8: Release of the STOP request causes the HOLD request to be dropped.

3-9: The CPU responds by dropping the HOLD ACK. The CPU begins executing the program again (i.e., executing code or programs steps).

3-10: 15 microseconds from the original REFRESH request, the next REFRESH request will arrive and the cycle will repeat itself.

The use of the microprocessor HOLD or STOP permits time dependent operations to be handled by the 32-bit microprocessor which is operating at a constant clock rate, in this case 16 MHz, without slowing the microprocessor down to a slower clock rate. The use of a slower clock rate has been previously suggested however this method of operating is not acceptable in an 80386 environment because it has the effect of slowing down all operations, not just those which are time dependent. Thus, in the typical application, the microprocessor is placed on HOLD only for so long as necessary to simulate the microprocessor speed which is necessary to perform time dependent functions.

Alternatively, the operation of the microprocessor can be placed in a deliberately slow mode by causing the one-shot timer to be re-initiated as soon as it is released. This is accomplished in software and once this software is executed, the operator selects a speed ranging from 1 to 50, or in the alternative specific speed designations which have been arbitrarily set. In this case the following speeds have been arbitrarily set which correspond to the speeds indicated below:

COMMON-Approximately equivalent to a speed setting of an 80286 microprocessor operating at clock rate of 6 MHz.

FAST-Approximately equivalent to a speed setting of an 80286 microprocessor operating at a clock rate of 8 MHz.

HIGH-Approximately equivalent to a speed setting of an 80386 microprocessor operating at a clock rate of 16 MHz.

The CPU HOLD request can be generated by either the arbitrated REFRESH request, the arbitrated DMA system request or the system speed control.

The speed control is logically ANDed with the one-shot to generate the CPU HOLD. The implementation of the one-shot provides the time delay necessary to stop the CPU for a specified time to "simulate" a microprocessor speed below that which corresponds to an 80386 microprocessor. The longer the time delay of the one-shot the slower the CPU "appears" to operate. The CPU speed is not reduced but rather only "appears to be reduced" since the CPU clock rate is not reduced but rather the CPU is stopped and started thereby generating an average CPU time which "appears" to be slower.

However, according to the above system, even when the CPU speed is apparently reduced, the current consumption of the CPU does not change. For this reason, it is required to apparently decrease the speed, and simultaneously reduce current consumption.

SUMMARY OF THE INVENTION

The present invention has been made in consideration of the above situation, and has as its object to provide a computer system which can apparently decrease the CPU speed and simultaneously reduce current consumption by asserting an STPCLK# signal at a predetermined interval.

It is another object of the present invention to provide a computer system which asserts an STPCLK# signal at a predetermined interval and inhibits the STPCLK# signal for a predetermined period to allow a high-speed operation only when a system event (e.g., an interrupt and display access) occurs, thereby saving power consumption while maintaining high-speed processing.

It is still another object of the present invention to provide a computer system which can execute a refresh cycle in a stop grant state and switch the refresh cycle period by asserting an STPCLK# signal in an ISA bus refresh cycle in place of the conventional HOLD/HLDA cycle.

In order to achieve the above object, according to the present invention there is provided a computer system comprising: a CPU receiving an interrupt signal which stops an internal clock of said CPU; and means for asserting the interrupt signal at a predetermined interval to set said CPU in a low power state, thereby decreasing an operation speed of said CPU and saving power consumption of said CPU.

According to the second aspect of the present invention, there is provided a computer system having a CPU receiving a stop clock signal which stops an internal clock of said CPU, comprising: means for asserting the stop clock signal at a predetermined interval to decrease an operation speed of said CPU and save power consumption of said CPU; and means for inhibiting assertion of the stop clock signal when a system event occurs while the stop clock signal is executed.

According to the third aspect of the present invention, there is provided a computer system receiving a CPU receiving a stop clock signal which stops an internal clock of said CPU, comprising: means for asserting the stop clock signal to set said CPU in a stop grant state which allows the CPU to be set in a low power state; means for executing a refresh cycle when said CPU is in the stop grant state; and means for designating whether the refresh cycle is to be executed when said CPU is in the stop grant state.

According to the fourth aspect of the present invention, there is provided a computer system having a central processing unit (CPU) receiving a stop clock signal which stops an internal clock of the CPU, comprising: means for asserting the stop clock signal at a predetermined interval to decrease an operation speed of the CPU and save power consumption of the CPU; and means, when an interrupt is already issued when the stop clock is to be asserted, for outputting a HOLD signal to the CPU without asserting the stop clock, thereby the CPU being set in a hold state and executing a refresh cycle.

According to the fifth aspect of the present invention, there is provided a computer system having a central processing unit (CPU) receiving a stop clock signal which stops an internal clock of the CPU, comprising: means for asserting the stop clock signal at a predetermined interval to decrease an operation speed of the CPU and save power consumption of the CPU; and means, when an interrupt is issued after the stop clock is asserted, for blocking the interrupt to be output to the CPU, for setting the CPU in a Stop Grant State which allows the CPU to be set in a low power state, and for executing a refresh cycle.

According to the sixth aspect of the present invention, there is provided a computer system having a central processing unit (CPU) receiving a stop clock signal which stops an internal clock of the CPU, comprising: means for asserting the stop clock signal at a predetermined interval to decrease an operation speed of the CPU and save power consumption of the CPU; and means, when an interrupt is issued after the stop clock is asserted, for passing through the interrupt the CPU, for setting the CPU in a Stop Grant State which allows the CPU to be set in a low power state, and for executing a refresh cycle.

According to the seventh aspect of the present invention, there is provided a computer system having a central processing unit (CPU) receiving a stop clock signal which stops an internal clock of the CPU, comprising: means for asserting the stop clock signal at a predetermined interval to decrease an operation speed of the CPU and save power consumption of the CPU; means for setting the CPU in a HALT state when a HALT signal is issued after the stop clock signal is asserted; means for outputting a HOLD signal to the CPU while asserting the stop clock signal, to thereby cause the CPU to execute a refresh cycle; means for issuing an interrupt signal to the CPU to set the CPU in a stop grant state which allows the CPU to be set in a low power state after the refresh cycle is executed, to thereby cause the CPU to execute a stop grant cycle during which the CPU is in the stop grant state; and means for deasserting the stop clock signal after the CPU completes the stop grant cycle.

According to the present invention, when the STPCLK# signal is asserted at a predetermined interval to set the CPU in the stop grant state, the speed can be apparently decreased, and the current consumption can be reduced.

Only when a system event (e.g., an interrupt and display access) is generated, assertion of the STPCLK# signal is inhibited for a predetermined time to allow a high-speed operation. Therefore, power consumption can be saved while maintaining high-speed processing.

When the STPCLK# signal is asserted in the ISA bus refresh cycle instead of the conventional HOLD/HLDA cycle, the refresh cycle can be performed in the stop grant state. In addition, since the cycle period in refresh cycle can be switched, this cycle can be used for speed switching.

As described above, according to the present invention, the refresh cycle is executed using the STPCLK# signal in place of the HOLD signal. Therefore, power consumption can be largely saved, and the drive time of a battery-driven portable computer or the like can be prolonged accordingly. In addition, when the interval stop clock function is used to programmably set the assert interval and assert time of the STPCLK# signal, the CPU operation speed can be finely switched from 9/10 to 1/10. Furthermore, when an interrupt factor takes place while the CPU is operated at a low speed using the interval stop clock function, the CPU can be operated at a high speed while stopping the interval stop clock function. Therefore, long-time battery driving is enabled while maintaining the high-speed operation of the CPU.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

FIG. 4 is a circuit diagram showing a circuit for realizing the power saving mode function using the stop clock function, which circuit is arranged in an ISA controller 11 shown in FIG. 3;

FIGS. 5A through 5D are timing charts showing the basic timing of an interval stop clock;

FIGS. 6A and 6B are timing charts for explaining a snap mode;

FIGS. 9A through 9D are timing charts showing the detailed timing of the interval stop clock;

FIGS. 10A through 10E are timing charts showing the timing of the interval stop clock in a case wherein other break factor (INTR, NMI, SMI, SRESET, or INIT) is generated during the operation;

FIGS. 11A through 11K are timing charts showing the stop clock refresh timing;

FIGS. 12A through 12H are timing charts showing the relationship between the stop clock refresh mode and an interrupt in a case wherein an interrupt is already issued when an STPCLK# signal is to be asserted;

FIGS. 13A through 13I are timing charts showing the relationship between the stop clock refresh mode and an interrupt in a case wherein an interrupt is issued after the STPCLK# signal is asserted in use of an 80486 as a CPU;

FIGS. 14A through 14I are timing charts showing the relationship between the stop clock refresh mode and an interrupt in a case wherein an interrupt is issued after the STPCLK# signal is asserted in use of a Pentium as a CPU;

FIGS. 15A through 15J are timing charts showing the relationship between the stop clock refresh mode and a HALT signal in a case wherein a HALT is output in use of a Pentium as a CPU.

DETAILED DESCRIPTION OF THE PREFERRED EMBODIMENTS

An embodiment of the present invention will be described below.

Figure 1:
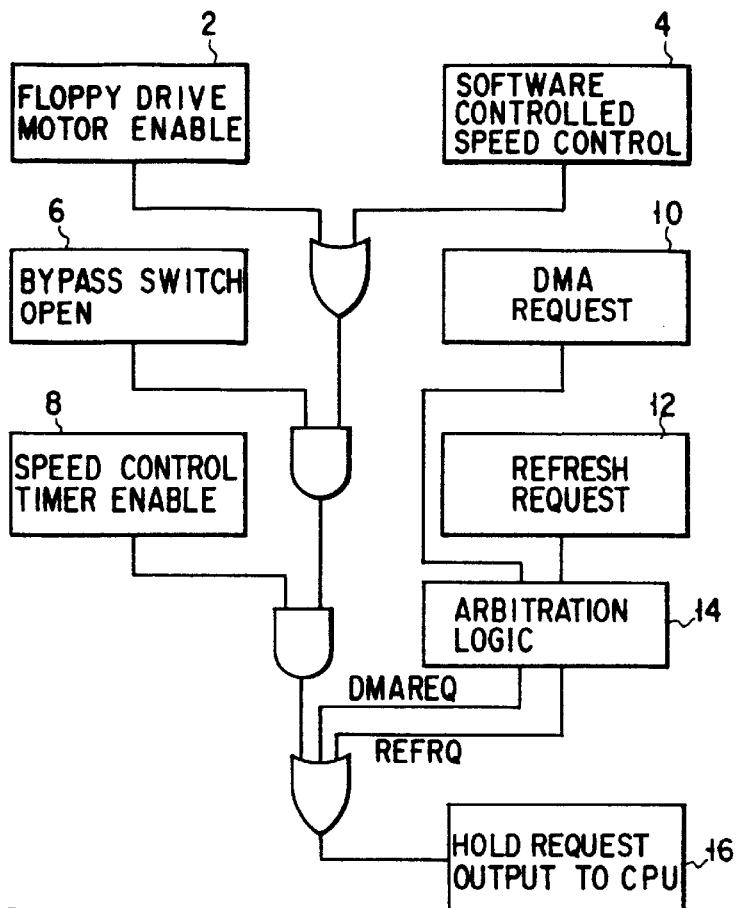
FIG. 1 is a block diagram for explaining extension of a HOLD signal in apparently decreasing the CPU operation speed by extending the refresh cycle in a prior art.
Figure 2:
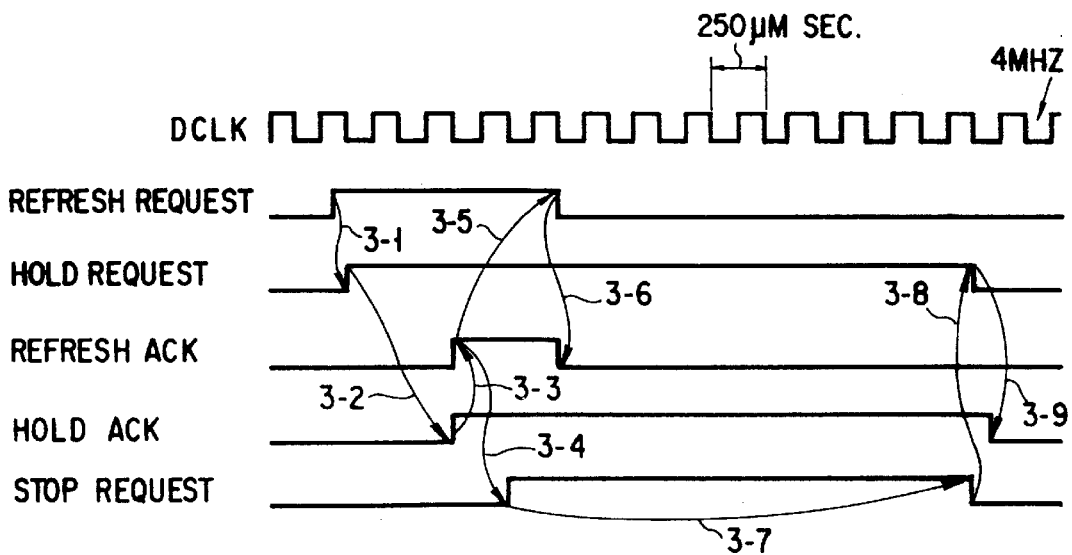
FIG. 2 is a timing diagram of signals appeared in FIG. 1.
Figure 3:
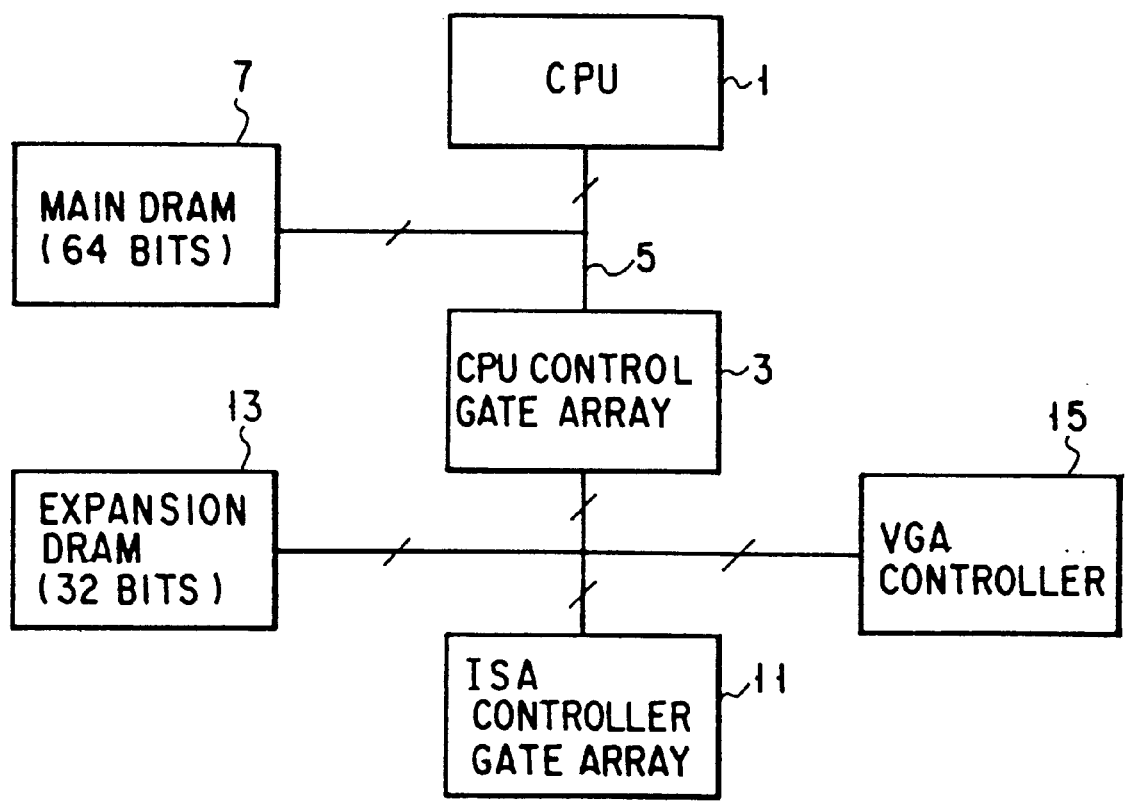
FIG. 3 is a block diagram showing a computer system according to an embodiment of the present invention, which has a power saving mode function using a stop clock function.

FIG. 3 is a block diagram schematically showing a computer system according to an embodiment of the present invention, which has a power saving mode function using a stop clock function. As shown in FIG. 3, a CPU 1 is a 32-bit CPU equivalent to, e.g., an SL enhanced 80486 or Pentium (P54C) available from Intel. The CPU 1 is connected to a CPU control gate array 3 and a main DRAM 7 through a CPU bus 5. The CPU control gate array 3 is constituted by a data bus drive block, a CPU control block, a DRAM mapper, a DRAM control block, and a CPU cycle check block.

The CPU controller controls the CPU cycle (i.e., control of cycle completion of the CPU on the basis of signals from a DRAM controller and a VL bus), CPU address decoding (an internal memory (64 bits), anexpansion memory (32 bits), a memory, an extended memory, a window in units of 16 KB of 000C0000H through 000FFFFFH, an SM-RAM, a write protect area, and a cache area), a control signal output to a data bus driver (a latch signal and a byte lane swap signal), output of an I/O buffer enable signal, and the like. The DRAM mapper performs DRAM mapping (address translation from a CPU address to a DRAM address, generation of a DRAM logical address, generation of a DRAM logical address corresponding to a conventional area, generation of a DRAM logical address corresponding to an extended area, and generation of a DRAM logical address corresponding to an SM-RAM area).

The DRAM controller performs DRAM control (control of access to the DRAM (CPU and external master/DMA), L1 write back cache corresponding control, shadow refresh control, cycle conversion (64×32) of access to a 32-bit expansion DRAM).

In addition, a selector for selecting register data from each block, an ADS# delay controller, a clock output delay controller to the CPU, a clock/reset/suspend controller, an additional circuit for a test, and the like are arranged. The CPU control gate array 3 is connected to an ISA control gate array 11, an expansion DRAM 13, and a VGA controller 15 through a VL bus 9. The ISA controller 11 controls the VGA controller 15 and the expansion DRAM 13 and interfaces the CPU 1 with the VGA controller 15 and the expansion DRAM 13 through the CPU control gate array 3.

FIG. 4 is a circuit diagram showing a circuit for asserting an interval stop clock (STPCLK#) at a predetermined interval. The circuit shown in FIG. 4 is arranged in the ISA control gate array 11 in FIG. 3. However, this circuit may also be arranged in the CPU control gate array 3. The interval stop clock (STPCLK#) function is described in detail in, e.g., "Intel 486 Microprocessor Family Data Book Addendum: SL Enhanced Intel 486 Microprocessor Family" issued in 1993, and "Pentium Processor Family User's Manual" issued in 1994. Referring to FIG. 4, a counter A 17 counts the request period of a request signal (ISRQI) shown in FIG. 5A. The request period is set by an interval stop clock enable register (REGA) 19. A counter B 23 counts the hold period of a stop clock signal (STPCLK#) shown in FIG. 5D. The hold period is programmably set by an interval stop clock hold register (REGB) 25.

The function of the interval stop clock enable register 19 is as follows.

A stop clock request is sent to the CPU 1 at a predetermined interval for a set period of time. When the request is received by the CPU 1 (only when the CPU 1 generates a stop grant cycle), a stop grant state is continuously set for another set period of time. Thereafter, the STPCLK# signal is deasserted (set at HIGH).
INTERVAL STOP CLOCK ENABLE REG.
bit 7-1: INTSC (INTERVAL STOPCLOCK ENABLE)
These bits enable/disable the interval stop clock function.
At "0", the interval stop clock function is disabled.
At "1", the interval stop clock function is enabled.
The counter A 17 starts to operate when "1" is set in these bits. The counter A 17 is stopped (cleared) when "0" is set in these bits.
bit 6-3: INH 3-0 (INTERVAL STOPCLOCK INHIBIT TIME)
Only when an SMI, NMI, INTR, INIT, or VGA access is generated, the interval stop clock (STPCLK#) is inhibited for a predetermined period of time. When "0" is set in all the bits INH 3-0, the function of inhibiting the interval stop clock (STPCLK#) is disabled.

| DIS3 | 2 | 1 | 0 | Interval stop clock inhibition period |
|---|---|---|---|---|
| 0 | 0 | 0 | 0 | Not inhibited |
| 0 | 0 | 0 | 1 | 1 ms |
| 0 | 0 | 1 | 0 | 2 ms |
| 0 | 0 | 1 | 1 | 3 ms |
| 1 | 1 | 1 | 1 | 15 ms |

These bits designate the interval for asserting the STPCLK# signal and become valid only when "1" is set in bit 7.

| BIT | 2 | 1 | 0 | STPCLK# assert interval |
|---|---|---|---|---|
| | 0 | 0 | 0 | 8 µs |
| | 0 | 0 | 1 | 16 µs |
| | 0 | 1 | 0 | 32 µs |
| | . | | | |
| | . | | | |
| | . | | | |
| | 1 | 1 | 0 | 512 µs |
| | 1 | 1 | 1 | 1024 µs |

The bit assignment and function of the interval stop clock hold register 25 are as follows.
bit 7-6: IRQ0SL, VGASL
These bits change the conditions for inhibiting the interval stop clock.
IRQ0SL=0: The interval is inhibited for a predetermined period of time by an INTR (Interrupt Request) signal excluding IRQ0 due to a timer interrupt.
IRQ0SL=1: The interval is inhibited for a predetermined period of time by an INTR signal including IRQ0 due to a time interrupt.
VGASL=0: The interval is inhibited for a predetermined time of period by access to VGA.
VGASL=1: The interval is not inhibited by access to VGA.
bit 5-0: HTIM 5-0 (HOLD TIMER 5-0)
These bits designate the time (hold time) of asserting the STPCLK# signal. The counter starts to operate after 10 clocks from the start (ADS#) of a stop grant cycle. When a value set by these bits is reached, the STPCLK# signal is deasserted (HIGH). The counter B 23 is cleared and stops its operation when the interval stop clock function is disabled, the bit set value is reached, or the STPCLK# signal is broken by an interrupt factor or the like.

| BIT | 5 | 4 | 3 | 2 | 1 | 0 | STPCLK# hold period |
|---|---|---|---|---|---|---|---|
| | 0 | 0 | 0 | 0 | 0 | 0 | 0 µs |
| | 0 | 0 | 0 | 0 | 0 | 1 | 1 µs |
| | 0 | 0 | 0 | 0 | 1 | 0 | 2 µs |
| | . | | | | | | |
| | . | | | | | | |
| | . | | | | | | |
| | 1 | 1 | 1 | 1 | 1 | 0 | 62 µs |
| | 1 | 1 | 1 | 1 | 1 | 1 | 63 µs |

Referring to FIG. 4, a comparator 21 compares a counter output from the counter A 17 with a counter set value in the register A 19. When the two values coincide with each other, a clear signal is supplied to the clear terminal of the counter A 17 to clear the counter A 17. A comparator 29 compares a counter output from the counter B 23 with a counter set value in the register B 25. When the two values coincide with each other, a clear signal is supplied to the clear terminal of the counter B 23 through an AND gate 27. A decoder 35 decodes the CPU status and detects a stop grant state. In the stop grant state, a clock is input to the PLL in the CPU 1 although the output from the PLL is stopped. This state is a high-speed wake-up state wherein the current consumption of the CPU is decreased (Icc=20 through 50 mA). This is described in detail in the above-described "Intel 486 Microprocessor Family Data Book Addendum" and "Pentium Processor Family User's Manual". The AND gate 27 supplies a clear signal from the comparator 29 to the counter B 23 in the stop grant state.

Reference numeral 31 denotes an inhibit timer for realizing a snap mode (normally, the STPCLK# signal is asserted at a predetermined interval to apparently decrease the operation speed, and when an interrupt factor or the like is generated, assertion of the STPCLK# signal is inhibited for a predetermined period of time to allow a high-speed operation). A counter 33, the register 19, and a comparator 37 are circuits for setting the interval stop clock inhibition period shown in FIG. 6A. The counter 33 starts a counting operation in response to an event (e.g., an INTR (Interrupt Request) signal, an NMI (Non-Maskable Interrupt) signal, an SMI (System Management Interrupt) signal, an SRESET (System Reset) signal, and an INIT (Initialize) signal. These signals are described in detail in the above-described "SL Enhanced Intel 486 Microprocessor Family" and "Pentium Processor Family User's Manual"). In bits 6 through 3 of the register 19, the interval stop clock inhibition period is set within a range of 1 through 15 ms. The comparator 37 compares a counter output from the counter 33 with a counter set value in the register 19, and outputs an interval stop clock inhibition signal to an AND gate 39 until the two values coincide with each other. During this time, the AND gate 39 outputs no interval stop clock signal (STPCLK#), as shown in FIG. 7.

Figures 7, 8:
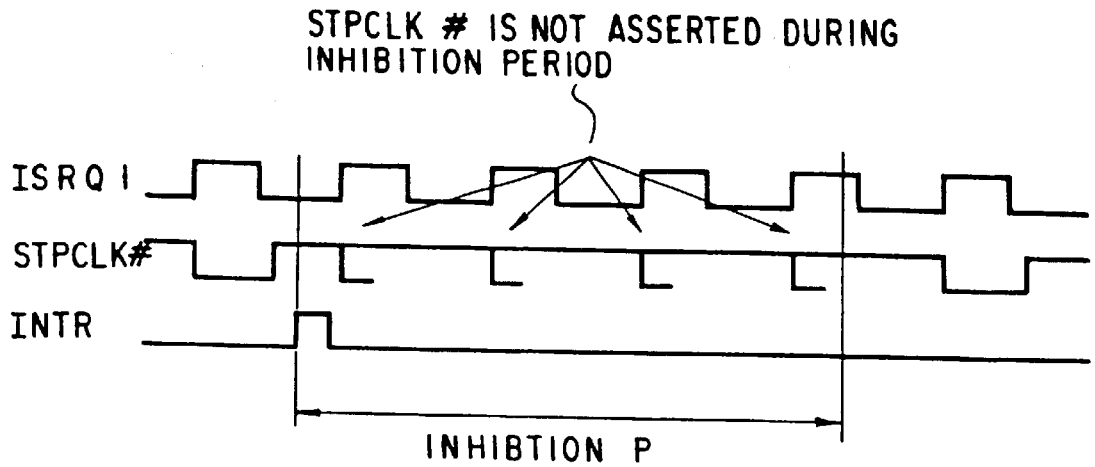
FIG. 7 is a timing chart showing a timing for inhibiting the interval stop clock.
FIG. 8 is a table showing processing performed when an INTR, SMI, NMI, SRESET (INIT), or VRAM access is made during the operation of the interval stop clock.

An arbitrator 41 performs processing in a case wherein an INTR, SMI, NMI, SRESET (INIT), or VGA access is generated during the operation of the interval stop clock signal (STPCLK#), as shown in FIG. 8.

As shown in the table of FIG. 8, there are three states: 1) an interval stop clock is output while the CPU is in operation, 2) an interval stop clock is output while the STPCLK# signal is at "0", and 3) an interval stop clock is output while the CPU 1 is in a stop grant state. By IRQ0 due to a timer interrupt, the inhibit timer 31 does not operate in any of states 1) through 3).

In state 1), when an INTR (IRQ0 through IRQ15), SMI, NMI, SRESET (INIT), or VGA access is made, the inhibit timer 31 is started. In state 2), when an INTR (IRQ0 through IRQ15), SMI, NMI, SRESET (INIT), or VGA access is made, the inhibit timer is started, and the CPU waits for a stop grant cycle. In state 3), when an INTR (IRQ0 through IRQ15), SMI, NMI, or SRESET (INIT) access is made, the stop grant state is broken, and the inhibit timer is started. When the CPU 1 is in the stop grant state, VGA access is not caused.

FIGS. 9A through 9D show the detailed timing of an interval stop clock. When an interval stop clock request (ISRQ1) is output, as shown in FIG. 9A, the STPCLK# signal is asserted, as shown in FIG. 9B (however, if any of the INTR, NMI, SMI, SRESET, and INIT signals is already issued, the STPCLK# signal is not asserted). When the STPCLK# signal is asserted in FIG. 9B, the CPU is set in the stop grant state, as shown in FIG. 9C. When the CPU is set in the stop grant state, the hold break timer (the counter 23, the register 25, and the comparator 29) starts to operate after 10 clocks from the ADS# signal (a signal representing the start of a new bus cycle) of the stop grant cycle, and a counting operation is performed for a period of time designated in the register 25, the hold timer is completed, as shown in FIG. 9D, and the interval stop clock request (ISRQ1) shown in FIG. 9A is turned off.

FIGS. 10A through 10E are timing charts showing a case wherein other break factor is caused when the interval stop clock (STPCLK#) signal is asserted, and the CPU is in the stop grant state. As shown in FIG. 10E, when other break factor is caused, the STPCLK# signal shown in FIG. 10B is deasserted, and the interval stop clock request (ISRQ1) and the hold timer (the counter 23, the register 25, and the comparator 29) are cleared, as shown in FIGS. 10A and 10D.

A stop clock refresh function will be described below. The stop clock refresh function executes the refresh cycle in the stop grant state by asserting the STPCLK# signal in the ISA bus refresh cycle instead of the conventional HOLD/HLDA cycle.

The ISA bus refresh function can be used when a desk station is connected through the extension connector of a notebook personal computer, and a DRAM expansion memory card is connected to the slot of the desk station. In this case, as a CPU interface signal, a refresh signal is defined as a bus specification. When this refresh signal is active, the CPU refreshes the expansion memory card.

This function is arranged in, e.g., the ISA control gate array 11 shown in FIG. 3. This function may also be arranged in the CPU control gate array 3. When a stop clock request due to refresh is issued, the ISA control gate array 11 monitors the assertion or halt cycle of an INTR, NMI, SMI#, or INIT signal. When any of these factors has already been caused, the function is switched to refresh in the normal HOLD/HLDA cycle. In this case, the STPCLK# signal is not asserted. Only when the above factor is not caused, the STPCLK# signal is asserted, and simultaneously, the INTR, NMI, SMI#, and INIT signals are blocked. In addition, when a halt cycle is generated after the STPCLK# signal is asserted, the STPCLK# signal is deasserted. However, the INTR, NMI, SMI#, and INIT signals are kept blocked not to break the halt cycle. As for current consumption, the halt cycle has the same sense as in the stop grant state, and the CPU operation is stopped in both the states. Therefore, it is meaningless to break the halt cycle and thereafter set the stop grant state to execute the refresh cycle. If a halt cycle is generated after the STPCLK# signal is output, the ISA control gate array determines that a pseudo stop grant cycle is generated (the STPCLK# signal is not asserted), and an HLDA signal (hold acknowledge signal) is generated in the gate array by the HOLD/HLDA take-over circuit which is supported from the start (in the stop clock state). When the hold request by the hold extension circuit in the refresh cycle is stopped, the HLDA signal is deasserted, and block of the INTR, NMI, SMI#, and INIT signals is released. In this case, the CPU performs the refresh cycle in the halt state. The hold extension time in the refresh cycle by the hold extension circuit is programmably set by designating in a register.

If a halt cycle is generated after the STPCLK# signal is asserted, the blocked HOLD signal may be output to the CPU to switch to refresh in the normal HOLD/HLDA cycle.

The stop clock refresh function will be described below.

The bit assignment and function of the stop clock refresh control register are as follows.

STOPCLOCK REFRESH CONTROL REG.

bit 7: This bit enables/disables the stop clock refresh function.

At "0", a normal refresh cycle is executed.

At "1", the STPCLK# signal is controlled in the refresh cycle.

The STPCLK# signal is used instead of controlling the conventional ISA refresh in the HOLD/HLDA cycle. During the ISA refresh cycle, the CPU is set in the stop grant state to decrease power consumption. When the refresh hold time is set long, the CPU is in the stop grant state for a longer period of time, and power consumption can be further decreased.

The STPCLK# signal is controlled only when a HOLD request due to ISA refresh is issued. For a HOLD request due to DMA/master, the STPCLK# signal does not go low.

When the stop clock refresh function is enabled, a HOLD request due to ISA refresh is not output to the CPU, and take over of an HLDA signal is performed in the gate array.

The stop grant state due to ISA refresh is not broken by the SMI, NMI, INIT, and SRESET signals.

During the stop grant state due to ISA refresh, the SMI, NMI, INTR, and SRESET signals are blocked. These signals are reissued at the leading edge of the first ADS# signal after the stop grant state is ended.

During the grant state, the CPU does not block the SMI, NMI, INTR, and INIT signals.

bits 6-1: Not used

Arbitration between the STPCLK# signal due to ISA refresh and the SRESET signal is performed. While the STPCLK# signal is low due to the ISA refresh, the SRESET request is blocked. When the STPCLK# signal goes high, the SRESET signal is reissued. During SRESET (without an ADS# signal), the STPCLK# signal is not asserted to low even when a HOLD request due to ISA refresh is output. When a HOLD request due to refresh is issued, this request is output to the CPU without being blocked. The CPU accepts the HOLD request even during SRESET.

The stop clock function and the stop clock refresh function can be simultaneously enabled. When the STPCLK# signal is at low at the timing of a HALT stop clock or a register read stop clock, the break event is masked during HOLD due to ISA refresh (at this time, HOLD/HLDA processing is taken over by the gate array, and the HOLD request is not output to the CPU). Upon completion of refresh, masking is canceled, and the break event (INTR, NMI, SMI, INIT, or SRESET) is received.

FIGS. 11A through 11K are timing charts showing the stop clock refresh timing. When a hold request (HDRQ) signal shown in FIG. 11D is output, a signal (RFSTS) representing that the hold request signal is due to active refresh is output, as shown in FIG. 11C. As a result, a stop clock signal (STPCLK# signal) shown in FIG. 11B is asserted. As shown in FIG. 11J, the CPU 1 is set in the stop grant state, and an ADS# signal representing the start of the stop grant cycle is output, as shown in FIG. 11H. Even when the STPCLK# signal is asserted, the HOLD signal is not output to the CPU, as shown in FIG. 11E, and a hold acknowledge signal (CGHLDAZ) shown in FIG. 11G is output by the HOLD/HLDA take-over circuit.

Figure 16:
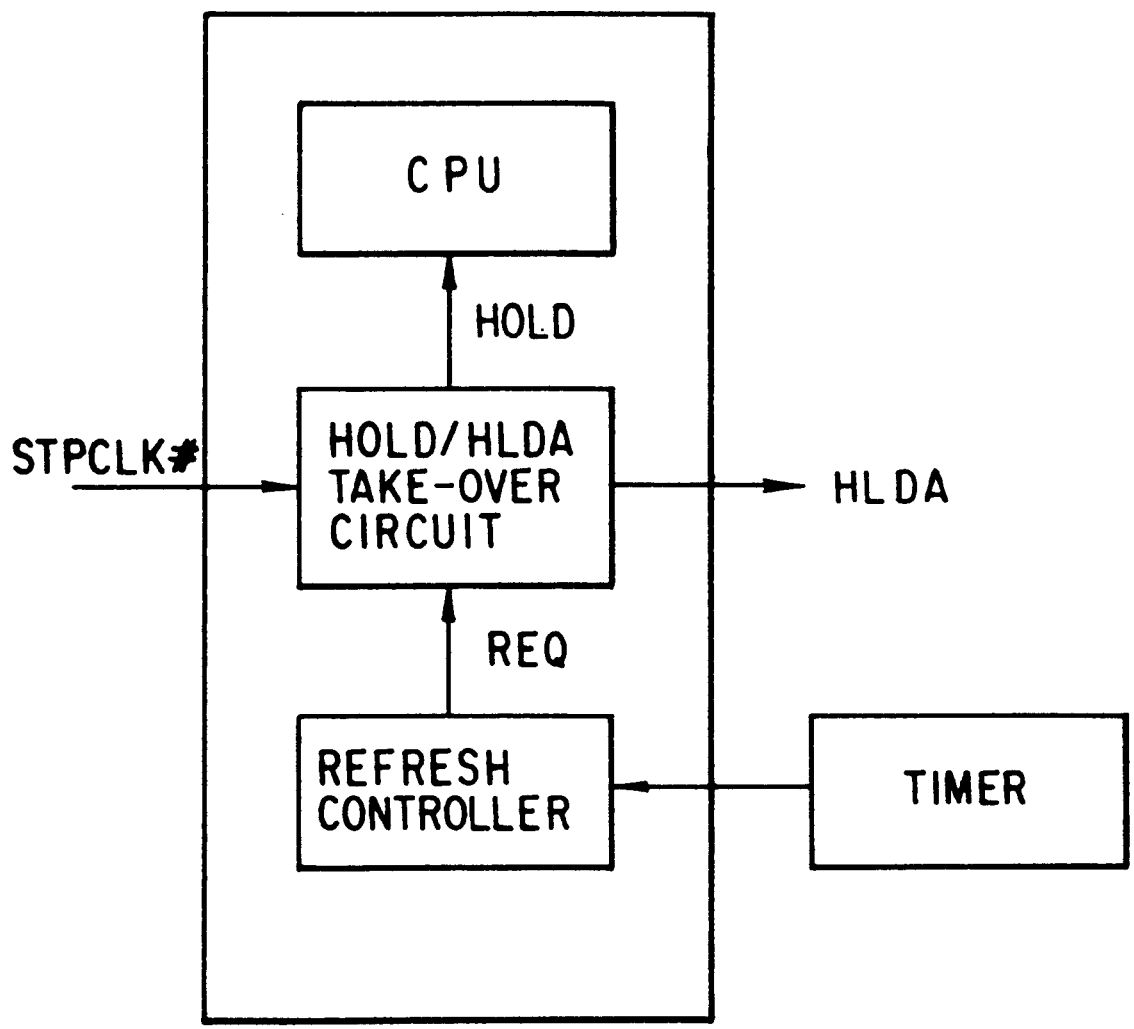
FIG. 16 is an explanatory view for explaining a HOLD/HLDA take-over circuit.

As shown in FIG. 16, assume that a refresh controller outputs a HOLD request to the HOLD/HLDA take-over circuit in response to an interrupt signal from a timer. At this time, if the clock has been switched immediately before, the CPU does not operate because it takes 1 ms due to the CPU specifications until the internal PLL is stabilized. On the other hand, DRAM refresh must be performed every 15 $\mu$s, so DRAM refresh cannot be performed. Therefore, the HOLD/HLDA take-over circuit outputs an HLDA signal as if the CPU accepted the HOLD request.

As shown in FIG. 11K, a signal (RFMD3) representing the refresh mode is output, and the refresh cycle is executed.

FIGS. 12A through 12H are timing charts showing the relationship between the stop clock refresh mode and an interrupt in a case wherein an interrupt is already issued when the STPCLK# signal is to be asserted.

As shown in FIG. 12E, a HOLD request signal (HDRQ) is output. Since an interrupt request (INTR) is issued, as shown in FIG. 12D, the STPCLK# signal is not asserted, and the HOLD signal is output to the CPU 1, as shown in FIG. 12F. As a result, as shown in FIG. 12G, the CPU 1 is set in the hold state, and the normal refresh cycle is executed.

FIGS. 13A through 13I are timing charts showing the timings of various signals in a case wherein an interrupt is issued after the STPCLK# signal is asserted in use of an 80486 as the CPU.

A hold request signal (HDRQ) is output, as shown in FIG. 13F, and a signal (RFSTS) representing that the hold request signal is due to active refresh is output, as shown in FIG. 13E. As a result, when an interrupt factor is caused as shown in FIG. 13D, the interrupt is blocked and not output to the CPU 1. During this time, as shown in FIG. 13H, the CPU 1 is set in the stop grant state, and the refresh cycle is executed, as shown in FIG. 13I. Thereafter, as shown in FIG. 13C, block (stop) of INTR0 is released upon output of the ADS# signal (not shown).

FIGS. 14A through 14I are timing charts showing the timings of various signals in a case wherein an interrupt is issued after the STPCLK# signal is asserted in use of a Pentium as the CPU.

When a hold request signal (HDRQ) is output, as shown in FIG. 14F, and an active refresh signal (RFSTS) shown in FIG. 14E is output, the STPCLK# signal is asserted, as shown in FIG. 14D. When an interrupt signal (INTR) shown in FIG. 14B is output, the ISA control gate array 11 outputs this signal to the CPU 1 without blocking the signal, as shown in FIG. 14C. As shown in FIG. 14H, the CPU 1 is set in the stop grant state, and a signal (RFMD3) representing the refresh mode is output, as shown in FIG. 14I, and the refresh cycle is executed.

FIGS. 15A through 15J are timing charts showing the relationship between the stop clock refresh mode and a HALT signal upon output of the HALT signal.

When a Pentium is used as the CPU, the CPU cannot be switched from the HALT state to the stop grant state. If the HALT cycle is started after the STPCLK# signal is asserted, the CPU stops in the HALT state. In an 80486, the HALT state can be shifted to the stop grant cycle, and no problem is posed. However, in the Pentium, the grant cycle cannot be started unless the CPU exits the HALT state. To exit the HALT state, an interrupt (INTR, NMI, and SMI#) is necessary. Therefore, interrupt through is necessary even in the stop grant state.

When a HALT signal is output after the STPCLK# signal is asserted, as shown in FIG. 15B, the CPU 1 is kept in the HALT state, as shown in FIG. 15H. The ISA control gate array 11 outputs a HOLD signal shown in FIG. 15E to the CPU 1 while keeping to assert the STPCLK# signal. The CPU 1 outputs a hold acknowledge signal (HLDA), as shown in FIG. 15H, and executes the refresh cycle, as shown in FIG. 15I. Thereafter, an interrupt signal (INTR) is issued, as shown in FIG. 15J, and the CPU 1 exits the HALT state and enters the stop grant state, as shown in FIG. 15H. When the CPU 1 completes the stop grant state, the ISA control gate array 11 deasserts the STPCLK# signal, as shown in FIG. 15B.

The function of the stop clock arbitrator 41 shown in FIG. 4 is as follows.

The arbitrator 41 performs arbitration between an SMI request, an INIT (SRESET) request, an NMI request, an INTR request, an STPCLK request, and a HOLD request.

Control in a CPU equivalent to a Pentium is called "P54 mode". Control in a CPU equivalent to an SL enhanced 486 is called "E486 mode".

1. Priority ("A>B" represents that A has priority over B)

Priority for a plurality of competing requests is defined as follows:

SMI#>INIT (SRESET)>STPCLK#
NMI, INTR>STPCLK#

No priority is set between SMI and INIT (SRESET) and between NMI and INTR.

These two sets of events have no influence on each other.

The STPCLK# signal is issued in accordance with a plurality of factors. There are the following six factors.

1) Request due to clock change
2) Clock stop request due to I/O read
3) Stop grant request due to I/O read
4) Clock stop request in response to a HALT signal
5) Interval stop grant request
6) Refresh stop grant request Priority is also set for these six factors.

Clock change>I/O read clock stop>I/O read grant>HALT clock stop>interval grant>refresh grant In the P54C mode, the stop grant cycle is not generated from the HALT state because of the CPU specifications. Therefore, clock stop itself due to the HALT signal is not supported.

Arbitration is also performed between the HOLD request and the STPCLK# request due to clock change, I/O read clock stop, HALT clock stop, and refresh grant.

Clock change>I/O read clock stop>HALT clock stop>refresh grant>HOLD request

Arbitration between the stop grant request due to I/O read, the interval stop grant request, and the HOLD request is unnecessary.

Control corresponding to the STPCLK# factor is performed by controlling six states from STATE 1 through STATE 6.

STATE 1: A state wherein the CPU can accept the STPCLK# request.

STATE 2: A state wherein the stop grant cycle is not completed although the STPCLK# signal is asserted due to any one of the above factors.

STATE 3: A state wherein the stop grant cycle is completed. Actually, this state is set after the stop grant cycle is completed, and a wait time corresponding to several clocks for enabling deassertion of the STPCLK# signal is completed. In some cases, STATE 3 shifts to STATE 6.

STATE 4: This state is assigned to take-over processing, AND/OR processing, and clock operation processing.

STATE 5: This state is assigned to STPCLK# deassert processing upon shift through STATE 4.

STATE 6: A state wherein the precharge time from deassertion of the STPCLK# signal to next enabling of assertion of the STPCLK# signal is maintained.

(I) Clock change: STATE processing

STATE 1 . . . No cancel condition for arbitration between the clock change request and other STPCLK# requests, the SMI# request, the INIT request, the NMI/INTR request, the HOLD request, and the HALT signal is present. The STPCLK# signal is asserted.

STATE 2 . . . Other STPCLK# requests, the SMI# request, the INIT request, the NMI/INTR request, and the HOLD request are blocked. Issue of the HALT signal is monitored. Upon detection of the HALT signal, block of the SMI# request, the INIT request, the NMI/INTR request, and the HOLD request is released. Upon completion of the stop grant cycle, the state shifts to STATE 3.

STATE 3 . . . If no HALT signal is detected, the state shifts to STATE 4. If the HALT signal is detected, the STPCLK# signal is deasserted without clearing the request latch F/F. Upon deasserting the STPCLK# signal (for clearing only the synchronous F/F), the state shifts to STATE 6.

STATE 4 . . . Take-over HLDA processing is performed (the CGHLDAZ signal is enabled). Clock change processing is performed. Upon completion of clock switching processing, the state shifts to STATE 5.

STATE 5 . . . Take-over HLDA processing is performed. Upon completion of take-over processing, the request latch F/F and the synchronous F/F are cleared. Upon deasserting the STPCLK# signal, the state shifts to STATE 6.

STATE 6 . . . Detection of the HALT signal is cleared. Block (stop) of the SMI# request, the INIT request, the NMI/INTR request, and the HOLD request is released. Upon completion of STPCLK# precharge, the state shifts to STATE 1. At the same time, block of other STPCLK# requests is released.

(II) I/O read clock stop: STATE processing

STATE 1 . . . Arbitration between the I/O read clock stop request and other STPCLK# requests, the SMI# request, the INIT request, the NMI/INTR request, the HOLD request, and the HALT signal is performed. No cancel condition is present. The STPCLK# signal is asserted.

STATE 2 . . . Other STPCLK# requests, the SMI# request, the INIT request, the NMI/INTR request, and the HOLD request are blocked. Issue of the HALT signal is monitored. Upon detection of the HALT signal, block of the SMI# request, the INIT request, the NMI/INTR request, and the HOLD request is released. Upon completion of the stop grant cycle, the state shifts to STATE 3.

STATE 3 . . . If no HALT signal is detected, the state shifts to STATE 4. If the HALT signal is detected, the STPCLK# signal is deasserted without clearing the request latch F/F. Upon deasserting the STPCLK# signal (for clearing only the synchronous F/F), the state shifts to STATE 6.

STATE 4 . . . Take-over HLDA start processing is performed. Clock stop processing (for enabling the CGHLDAZ signal) is performed. A break event is monitored. Break event . . . Four conditions such as the presence of an SMI request, the presence of an INIT (SRESET) request, the presence of an NMI request and NMISL=1, and the presence of an INT request and INTSL=1. Upon detection of a break event, clock start processing is performed. Upon completion of clock start processing, the state shifts to STATE 5.

STATE 5 . . . Take-over HLDA completion processing is performed. Upon completion of take-over HLDA processing, the request latch F/F and the synchronous F/F are cleared. Upon deasserting the STPCLK# signal, the state shifts to STATE 6.

STATE 6 . . . Detection of the HALT signal is cleared. Block of the SMI# request, the INIT request, the NMI/INTR request, and the HOLD request is released. When the STPCLK# precharge time is completed, the state shifts to STATE 1. At the same time, block of other STPCLK# requests is released.

(III) I/O read grant: STATE processing

STATE 1 . . . Arbitration between the I/O read grant request and other STPCLK# requests, the SMI request, the INIT request, and the NMI/INTR request is performed. No cancel condition is present. The STPCLK# signal is asserted.

STATE 2 . . . Other STPCLK# requests are blocked. Upon completion of the stop grant cycle, the state shifts to STATE 3.

STATE 3 . . . A break event is monitored. Break event . . . Four conditions such as the presence of an SMI# request, the presence of an INIT (SRESET) request, the presence of an NMI request and NMISL=1, and the presence of an INT request and INTSL=1. Upon detection of a break event, the request latch F/F and the synchronous F/F are cleared. Upon deasserting the STPCLK# signal, the state shifts to STATE p6.

STATE 6 . . . When the STPCLK# precharge time is completed, the state shifts to STATE 1. At the same time, block of other STPCLK# requests is released.

(IV) Interval grant: STATE processing

STATE 1 . . . Arbitration between the interval grant request and other STPCLK# requests, the SMI# request, the INIT request, and the NMI/INTR request is performed. Upon submitting to the arbitration, the interval grant request is canceled (the request latch F/F and the synchronous F/F are cleared). The STPCLK# signal is asserted.

STATE 2 . . . Other STPCLK# requests are blocked. Upon completion of the stop grant cycle, the state shifts to STATE 3.

STATE 3 . . . An interval break enable signal is issued. A break event is monitored. Break event . . . Five conditions such as the presence of an SMI# request, the presence of an INIT (SRESET) request, the presence of an NMI request and NMISL=1, the presence of an INT request and INTSL=1, and interval stop clock hold time out. Upon detection of a break event, the request latch F/F and the synchronous F/F are cleared. Upon deasserting the STPCLK# signal, the state shifts to STATE 6.

STATE 6 . . . The interval break enable signal is canceled. When the STPCLK# precharge time is completed, the state shifts to STATE 1. At the same time, block of other STPCLK# requests is released.

(V) Refresh grant: STATE processing

STATE 1 . . . Arbitration between the refresh grant request and other STPCLK# requests, the SMI# request, the INIT request, the NMI/INTR request, and the HALT signal is performed. Upon submitting to the arbitration, the refresh grant request is canceled. The STPCLK# signal (for clearing the request latch F/F and the synchronous F/F) is asserted.

STATE 2 . . . Other STPCLK# requests and the HOLD request are blocked. Issue of the HALT signal is monitored. Upon detection of the HALT signal, block of the HOLD request is released. Upon completion of the stop grant cycle, the state shifts to STATE 3.

STATE 3 . . . If no HALT signal is issued, the state shifts to STATE 4. If the HALT signal is issued, the request latch F/F and the synchronous F/F are cleared. Upon deasserting the STPCLK# signal, the state shifts to STATE 6.

STATE 4 . . . Take-over HLDA start processing is performed (the CGHLDAZ signal is enabled). A break event is monitored. Upon detection of a break event, the state shifts to STATE 5.

STATE 5 . . . Take-over HLDA completion processing is performed. Upon completion of take-over HLDA processing, the request latch F/F and the synchronous F/F are cleared. Upon deasserting the STPCLK# signal, the state shifts to STATE 6.

STATE 6 . . . Detection of the HALT signal is cleared. Block of the HOLD request is released. When the STPCLK# precharge time is completed, the state shifts to STATE 1. At the same time, block of other STPCLK# signals is released.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A computer system comprising:

a central processing unit (CPU) coupled to receive a signal which stops an internal clock of the CPU;

means for periodically asserting the signal to set the CPU in a low power state; and a circuit, coupled to the CPU, for blocking the assertion of a system event request with respect to the CPU while the signal is asserted, wherein the circuit holds the system event request, breaks the assertion of the signal in response to the held system event request, and then outputs the held system event request to the CPU after the assertion of the signal is broken.

2. The system according to claim 1, wherein the signal is a stop clock signal (STPCLK).

3. The system according to claim 2, further comprising a timer for counting, in response to the break of the STPCLK signal, a predetermined period of time during which the assertion of the STPCLK is blocked.

4. A computer system comprising:

a central processing unit (CPU) coupled to receive a signal which stops an internal clock of the CPU;

means for periodically asserting the signal to set the CPU in a lower power state; and a circuit, coupled to the CPU, for blocking the assertion of and holding a system event request with respect to the CPU while the CPU is in a stop grant state, and releasing the system event request with respect to the CPU after the stop grant state is broken.

5. The system according to claim 4, wherein the signal is a stop clock (STPCLK).

6. The system according to claim 4, wherein the system event request includes at least one of a system management interrupt (SMI) request, a non-maskable interrupt (NMI) request, an Interrupt Request (INTR), and a hold request.

7. A circuit comprising:

a first circuit for outputting a signal which periodically stops an internal clock of a central processing unit (CPU) to the CPU, the signal being periodically asserted; and a second circuit for receiving a system event request with respect to the CPU,
wherein the first and second circuit hold the system event request, break the assertion of the signal in response to the held system event request, and then output the held system event request to the CPU after the assertion of the signal is broken.

8. The circuit according to claim 7, wherein the signal is a stop clock signal (STPCLK).

9. The circuit according to claim 7, wherein said first and second circuit are arranged in a gate array.

10. The circuit according to claim 7, wherein the system event request includes at least one of a system management interrupt (SMI) request, a non-maskable interrupt (NMI) request, an Interrupt Request (INTR), and a hold request.

* * * * *